April 28, 1931. C. A. CAMPBELL 1,802,403
ANGLE COCK
Filed March 24, 1928
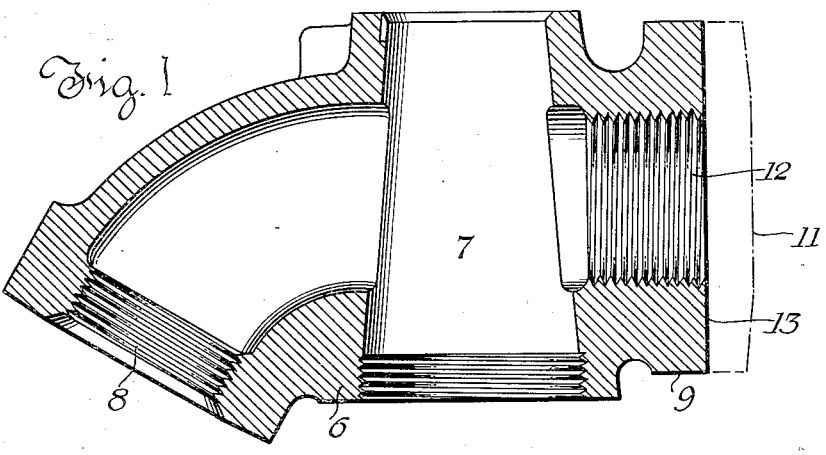
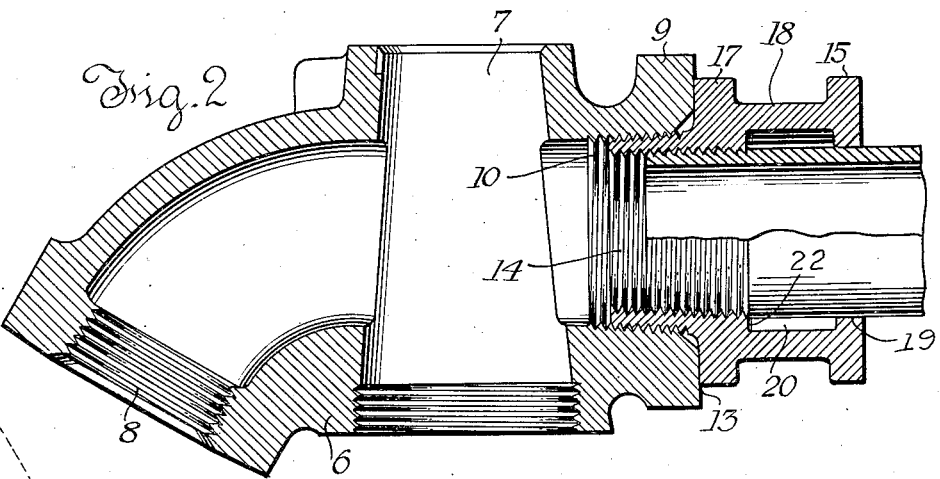
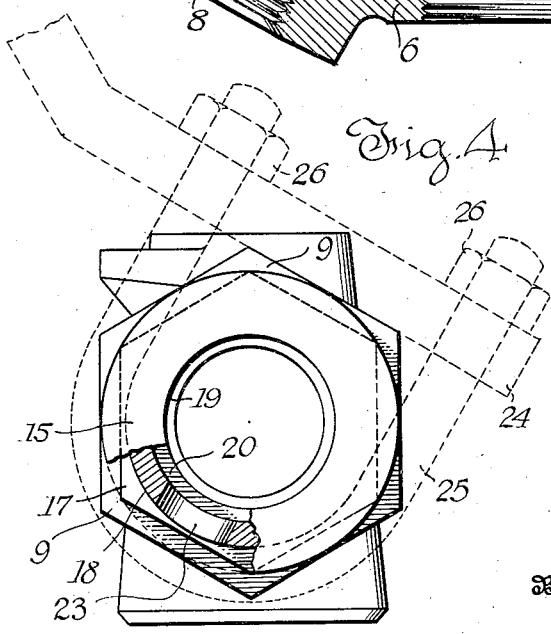
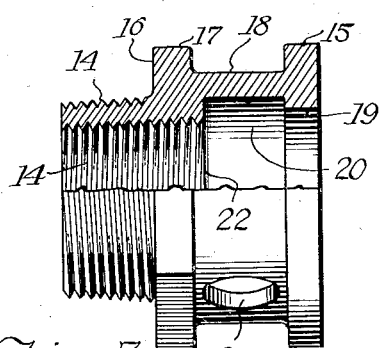
Inventor
Charles A. Campbell
By Dodge
Attorneys Patented Apr. 28, 1931

1,802,403

UNITED STATES PATENT OFFICE

CHARLES A. CAMPBELL, OF WATERTOWN, NEW YORK, ASSIGNOR TO THE NEW YORK AIR BRAKE COMPANY, A CORPORATION OF NEW JERSEY

ANGLE COCK

Application filed March 24, 1928. Serial No. 264,388.

This invention relates to supports for brake pipes on railway cars and particularly to a method and fitting for converting existing angle cocks of the old type so that they shall conform to modern standards and be available for use with modern train pipe supporting clamps.

There has been recently adopted for railroad use a type of angle cock which has an unthreaded sleeve extension projecting from the threaded boss on the cock which receives the threaded end of the brake pipe. This unthreaded extension encircles and makes a slip fit with the unthreaded portion of the pipe and transmits to the unthreaded portion of the pipe bending stresses applied to the angle cock in service, and thus serves to relieve the threaded portion of the pipe of stresses which frequently caused failure at this point. The effect of the extension is to maintain the alinement of the pipe and cock independently of the threaded engagement between the two and this obviously relieves the threads of severe local stresses which would otherwise be occasioned by lateral forces acting upon the cock.

This extension has another advantage in that it offers a convenient seat for the strap or stirrup which clamps the train pipe in place, and there has therefore come into use a type of train pipe mounting in which this extension is engaged by the stirrup in such a way as to hold one of the flats on the hexagonal boss against a flat surface on the hanger.
This prevents turning of the cock on the brake pipe.

There are, of course, in service many thousands of cocks of the old type which are entirely serviceable but which are inferior to the new type of cock because relatively weak, and which are inconvenient in use because pipes equipped with them must be somewhat differently mounted.

The present invention secures many of the advantages inherent in the new type cock by converting existing cocks to conform to the same dimensional standards. This is done by the application to an old type cock, after appropriate reboring and facing operations, of a special bushing so designed as to resist bending stresses, and carrying an extension sleeve which performs functions similar to those of the extension sleeves above described.

This bushing might be similarly used with various types of cock body or, conceivably, with pipe fittings, but derives its particular utility in the special relation above mentioned and will be described as so applied.

The conversion of an old type air brake angle cock designed for use with 1¼" brake pipe, is illustrated in the accompanying drawing in which,—

Fig. 1 is a vertical axial section of an angle cock body after refacing and before reboring. The original contour of the refaced portion is indicated in dot-and-dash lines.

Fig. 2 is a similar view after reboring and rethreading, and showing the bushing in place.

Fig. 3 is a detail view half in section and half in elevation showing the bushing.

Fig. 4 is a view looking to the left relatively to Fig. 2 and showing in dotted lines a supporting clamp of conventional form, to illustrate how this clamp engages the converted cock.

The body of an old type angle cock is illustrated at 6. The tapered bore for the cock plug is shown at 7 and the threads for the hose nipple are shown at 8. 9 is the hexagonal boss to which the wrench is applied in screwing the cock body onto the brake pipe. As originally constructed the dimension of the boss 9 in the direction of the axis of the brake pipe was substantially greater, the original contour being indicated by the dot-and-dash line 11. The ordinary pipe threads for 1¼" pipe are shown at 12 in Fig. 1.

The first operation in converting the cock is to face off the hexagonal boss 9 to the plane indicated at 13 in Fig. 1, reboring and rethreading the cock for 1½" pipe. The new threads are indicated at 10 on Fig. 2. Into the threads 10 is screwed an adapter of special form. This includes a nipple 14 which is externally threaded with 1½" pipe threads and internally threaded with 1¼" pipe threads. At the end of the nipple 14 is a shoulder 16 which is designed to seat against the plane face 13 on the cock body 6. Beyond this there is a hexagonal nut or boss 17 which receives a wrench to screw the nipple to place. Beyond boss 17 is a channel 18 intended to be engaged by the supporting stirrup iron and bounded at the end of the fitting by an annular flange or collar 15. The sleeve extension is unthreaded and is intended to surround the brake pipe. It is formed with an inwardly extending collar 19 at its extremity, that is, within collar 15, and this makes a slip fit with the exterior of the pipe. Between the collar 19 and the threaded nipple there is a relief groove 20. The purpose of this is to insure ready application and to avoid the necessity for too precise alinement.

It has been found in practice that in order to have the flange 16 seat firmly against the end surface 13 of the boss 9, the threads should be so formed that the fitting may be screwed in by hand to approximately $\frac{5}{32}''$ from its final position. It is then screwed home with a wrench. In its final position the plane defined by the line 22 which marks the ends of the internal threads in the nipple 14, is the same distance from the axis of the bore 7 as was the plane defined by the line 11 (see Fig. 1).

The hexagonal boss 17 is preferably so formed that the measurement across the points of the hexagon is slightly less than, or at any rate does not exceed, the measurement across the flats of the hexagonal boss 9. The purpose is to insure that no portions of the boss 17 shall project beyond plane surfaces of the hexagonal boss 9.

After the bushing is assembled with the cock a drain port 23 is drilled in the channel 18 for the purpose of draining any liquid or foreign matter from the relief groove 20.

The mode of mounting converted cocks is indicated schematically in Fig. 4. The bar 24 is a portion of the train pipe hanger bracket and is shown in engagement with one of the flat faces of the hexagonal boss 9. The stirrup iron 25 encircles the seat or channel 18 on the bushing and is drawn up by the nuts 26. The effect is to hold the angle cock against turning so that it can not unscrew from the brake pipe. The threaded bushing has in common with any threaded bushing which might be used between the end of the brake pipe and the bore of the cock, threaded engagement with each. In addition to this threaded engagement it has thrust engagement with the end of the cock body and encircling engagement with the exterior of the brake pipe, and the effect of these two engagements is to maintain alinement of the bushing with the pipe and with the cock by means additional to the threaded engagement. This amounts to saying that the bushing operates to maintain alinement of the cock and pipe by means independent of the threaded engagement.

The final result thus is something distinctly superior from the standpoint of strength, and at the same time it affords many of the advantages in practice of sleeve extension cocks made in one piece. The converted cocks conform to the same dimensional standards as the cock before conversion and as the standard new type cock, and this is peculiarly advantageous for railway use where adherence to established standards is a determining factor for use. Of course, in cases where adherence to dimensional standards is not important, certain advantages of the invention can be secured without such adherence, and in such cases quite wide variation in dimensions are permissible. Moreover the invention is not limited to the exact form of the bushing illustrated, though I prefer this because of its adherence to established standards.

What is claimed is,—

1. The combination with an angle cock body and a brake pipe, of a tubular fitting in threaded engagement with each and having portions distinct from the threaded portion of the fitting and entering into positive engagement with the pipe and cock body to maintain the alinement thereof and resist lateral stresses.

2. The combination with an angle cock body and a brake pipe, of a bushing into which the pipe is threaded, and which is threaded into the cock body, said bushing having a shoulder in thrust engagement with the body, and an unthreaded extension which engages and confines the pipe.

3. The combination with an angle cock body and a brake pipe, of a bushing into which the pipe is threaded, and which is threaded into the cock body, said bushing having a shoulder in thrust engagement with the body, an unthreaded extension which engages and confines the pipe, and a seat for a supporting clamp formed on said extension.

4. The combination with an angle cock body and a brake pipe, of an internally and externally threaded bushing interposed between the two and in threaded engagement with both; an annular shoulder formed on said bushing and seating against the body; and an integral sleeve extending in axial alinement with said bushing and having a contracted end which encircles and engages an unthreaded portion of the pipe.

5. The combination with an angle cock body and a brake pipe, of an internally and externally threaded bushing interposed between the two and in threaded engagement with both; an annular shoulder formed on said bushing and seating against the body; an integral sleeve extending in axial alinement with said bushing and having a contracted end which encircles and engages an unthreaded portion of the pipe, there being an internal relief channel within said bushing between the threaded portion thereof and said contracted end, and a relief opening leading therefrom.

6. The combination with an angle cock body and a brake pipe, of an internally and externally threaded bushing interposed between the two and in threaded engagement with both; an annular shoulder formed on said bushing and seating against the body; an integral sleeve extending in axial alinement with said bushing and having a contracted end which encircles and engages an unthreaded portion of the pipe; and a seat for a supporting clamp formed on said extension.

7. A converted angle cock comprising in combination, a cock body having threaded boss; and an internally and externally threaded pipe bushing screwed into the threads in said boss and having a shoulder which seats against said boss, and a projecting sleeve which is adapted to confine against lateral deflection a pipe threaded into said bushing.

8. A converted angle cock comprising in combination, a standard cock body having a portion of the threaded boss faced off and rebored and threaded to an oversize; an internally and externally threaded pipe bushing screwed into said oversize threads and having a shoulder which seats against the faced portion of said boss; and a projecting sleeve which is adapted to confine against lateral deflection a pipe threaded into said bushing, said bushing being so dimensioned that the converted angle cock may be screwed upon the same pipe as the original cock before conversion and will then be positioned in substantially the same relation to said pipe.

9. A combined bushing and reinforce for pipe joints, comprising in one piece, an internally and externally threaded bushing portion; a pipe-alining unthreaded tubular extension portion; and a shoulder at the junction of said extension portion and said threaded bushing portion, adapted to abut against a part threaded on the bushing and maintain alinement of the part with the bushing.

10. A combined bushing reinforce and support for pipe joints, comprising in one piece an internally and externally threaded bushing portion; a pipe-alining unthreaded extension portion; a seat for a supporting clamp formed on said extension; and a shoulder at the junction of said threaded bushing portion and said extension portion, adapted to abut against a part threaded on the bushing and maintain alinement of the part with the bushing.

11. A combined bushing and reinforce for pipe joints, comprising in one piece, an internally and externally threaded bushing portion; a pipe-alining unthreaded tubular extension portion having a circumferential internal relief groove between its outer end and the threaded portion; and a shoulder at the junction of said extension portion and said threaded bushing portion, adapted to abut against a part threaded on the bushing and maintain alinement of the part with the bushing.

12. A combined bushing and reinforce for pipe joints, comprising in one piece, an internally and externally threaded bushing portion; a pipe-alining unthreaded tubular extension portion having a circumferential internal relief groove and the through port therefrom, between its outer end and the threaded portion; and a shoulder at the junction of said extension portion and said threaded bushing portion, adapted to abut against a part threaded on the bushing and maintain alinement of the part with the bushing.

In testimony whereof I have signed my name to this specification.

CHARLES A CAMPBELL.